Patented Feb. 23, 1943

2,312,296

UNITED STATES PATENT OFFICE 2,312,296

METHOD OF FORMING COATED PRODUCT

Charles H. Hempel, Manitowoc, Wis., assignor to Heresite & Chemical Company, a corporation of Wisconsin No Drawing. Application November 12, 1940, Serial No. 365,381

4 Claims. (Cl. 117—47)

This invention relates to a coated product and a method of forming the same, and more particularly to a method of providing an adherent corrosion resistant phenol formaldehyde coating on an organic base and more particularly on a molded resinous base such as a molded phenol formaldehyde resin.

At the present time molded plastics are finished with smooth and polished surfaces which are resistant to many types of corrosion but are non-resistant to others. It has hitherto been impossible to coat such a molded material with a product having any substantial increased corrosion resistance. The plastics may be coated with decorative paints of the ordinary oil containing type, but such coatings do not have any substantially increased corrosion resistance.

By means of the present invention it is possible for the first time to coat a plastic in such manner as to provide corrosion resistance of the type provided on metals by the coating described in my Patent 2,198,939, issued April 30, 1940. The importance of the present improvement has become increasingly great because of the desirability of replacing certain metals with more plentiful and available organic substitutes. For example, in the washing machine industry, agitators are now made from metal of one type or another, but by means of the present invention it is possible to replace them by molded plastic parts. Similarly, rayon spinning buckets, now primarily made of aluminum, can be made from molded and laminated plastics, as can spinning bobbins, Godet bearings, filter candles, trays, dishes, automobile steering wheels, refrigerator doors, radio cabinets, automobile garnish moldings, bathroom equipment, and chemical equipment in general.

In carrying out the process, a molded article, which is preferably a phenol formaldehyde resin compound, but may be urea formaldehyde resin, or other synthetic resin, or other organic complex such as hard rubber, is given a preliminary treatment which involves two phases. The molded articles are generally smooth and polished, either by reason of special treatment, or by reason of the character of the molds employed in forming them. This surface requires a slight roughening. The roughened surface is then treated with caustic alkali in such a way as to leave a trace only of the caustic thereon, after which the phenol formaldehyde coating may be applied to it. In the preferred form of process the roughening step is combined with the alkalizing step.

As an example of the process, a molded phenol formaldehyde washing machine agitator, either laminated, or provided with customary fillers and without fabric support, is dipped in a caustic alkali solution. The concentration of the solution, the temperature thereof, and the time of treatment are all correlated to the characteristics of the resin undergoing treatment so as to produce the proper amount of roughening without unduly roughening the surface. For a highly polished phenol formaldehyde molded article properly baked, a solution containing 5 grams of sodium hydroxide for 95 grams of water, maintained at a temperature between 60 and 70° C., is satisfactory for an immersion time of 3 to 5 minutes.

The product is then carefully rinsed to remove most but not all of the alkali. For example, it may be washed in a running water bath maintained at 60 to 70° C. for 2 to 3 minutes. If too much caustic alkali is left on the molded article, no adherence will be secured.

The caustic soda may be replaced with caustic potash in the same concentration.

If the molded resin has not been carried to the final insoluble infusible stage, the strength of the caustic or the time of the treatment will have to be drastically changed so that no serious roughening of the surface occure.

In carrying out the process on each large batch, it is advisable to run a test sample to check the proper correlation time, temperature and concentration.

After the water rinse has been completed, the article is dried in an oven. A suitable drying temperature is 70 to 80° C. for 30 to 45 minutes. The finished article should show a slightly roughened surface resembling in texture the finest grade of sand paper (0000).

Thereafter the material is provided with a clear phenol formaldehyde resin coating (that is, one free from oil, as described in my aforesaid Patent 2,198,939). The first or prime coat may be applied by spray or by dipping. This coating is air-dried from 15 to 30 minutes and then cured or baked in an oven at a temperature of about 120° C. for 15 minutes. The second, third and fourth coats are applied the same way and similarly baked. The final coat, whichever it is, should be baked at 120 to 140° C. for 1 to 2 hours.

The corrosion resistant coating preferably contains 10% to 45% filler by volume of the resin, and especially from 25% to 35% thereof. The filler should be inert, extremely finely divided, and suitably may be ochre, sienna, umber, barium sulfate, lithopone, zinc oxide, zinc sulfide, titanium dioxide or kaolin.

As an example of the coating material a pure phenol formaldehyde resin is prepared by incorporating with 100 parts of phenol 150 parts of 40% by volume formaldehyde and one part of ammonium hydroxide (26° Bé.). These ingredients are boiled in a reflux condenser until resin precipitates and the condensation is then continued for ½ hour more. The water present is then removed by vacuum distillation until the temperature of the resin reaches 108–115° C. and a sample remains clear and is without stickiness under cold water. The resultant resin is then dissolved in ethyl alcohol to form an approximately 85% solution of the resin.

This solution is mixed with suitable pigments or filler and ground in a pebble mill until a film of the coating is free from coarse particles. This requires upwards of 96 hours of grinding. The grinding must be carried out in the resin solution since the ordinary solvents have no suspending effect in the absence of oil.

As a specific example of the invention, 35% of barium sulfate by volume was employed as the filler and was incorporated as above set forth. After grinding, the mixture was treated with a solvent, for example, one comprising:

|   | Per cent |
|---|---|
| Ethyl alcohol | 50 |
| Toluol | 35 |
| Butyl alcohol | 10 |
| Amyl acetate | 5 |

The dilution of the resin in the solvent will, of course, depend on the manner of application and the material to which it is to be applied. For example, for dipping or spraying it may be diluted to a specific gravity of approximately 1.000. When dipped, the dipped base is allowed to drain, the excess material which clings to the bottom of the article is removed, and the solvent is permitted to escape from the coating. The article is then baked in an oven for approximately 10 minutes at approximately 150° C. At 80° C. a three-hour heating period may be employed, whereas, at 100° C. it may be ½ to 1 hour. This process is repeated until four layers of the coating have been thus applied. Thereafter two coats of the unpigmented resin are applied, dissolved in the same solvent. After applying the last coating the baking is carried out for approximately 2 hours at 150° C. No pressure is employed.

For another example of the application, the following procedure may be performed and satisfactory results will be obtained. The prime coat application may consist of one or two layers of pigmented phenol formaldehyde resin followed by only one or two layers of a pure phenol formaldehyde non-pigmented resin solution, or containing only a small amount of pigment which is incorporated in order to secure the desired color. Nevertheless, it is essential to apply the pigmented phenol formaldehyde coating before a urea-formaldehyde type coating is applied because the phenol formaldehyde resin gives the required resistance. The phenol formaldehyde resin is not attacked by the action of soap solution, boiling water, weak alkalis or weak acids, whereas the urea-formaldehyde resins will not withstand any of this action. The urea-formaldehyde resin alone, even with primers underneath of the same nature, will not withstand this action. In the case of washing machine agitators, where resistance against boiling soap solution is required, the final layer of phenol formaldehyde resin may be replaced with a pure urea-formaldehyde resin coating, an alkyd-urea-formaldehyde resin coating or a plasticized urea-formaldehyde resin coating which has been pigmented with titanium dioxide, zinc oxide, or some other pigment.

The urea-formaldehyde resins, applied and baked under the same procedure as the phenol formaldehyde resins, form a solid bond with the prime coat composed of pigmented phenol formaldehyde resins and so obtain the resistance which they lack when applied alone, whether in pigmented or non-pigmented form.

The coated article as prepared by the above process has a glass-like appearance and a remarkable hardness.

The function of the caustic alkali is apparently one of catalysis. In each synthetic resin there are some uncombined molecules and the trace of sodium or potassium hydroxide which remains on the molding material apparently acts in some way to interbond these molecules with the molecules of the coating material. This also appears to be true in urea-formaldehyde resins, furfural resins, and the like. It is not true of other bases, such as hard rubber, but on these, the caustic acts as a cleanser which provides a clean adherent surface.

The foregoing detailed description has been given for clearness of understanding only, and no unnecessary limitations should be understood therefrom.

What I claim as new, and desire to secure by Letters Patent, is:

1. The method of coating a tough hard substantially insoluble resinous base which comprises treating a surface thereof with caustic alkali for a period sufficient to roughen it, removing substantially all of the alkali, and then applying an oil-free phenol formaldehyde resin coating thereto, and heating the coating to transform it to the insoluble infusible stage.

2. The method of coating a tough hard substantially insoluble resinous base which comprises roughening a surface thereof, providing a trace of caustic alkali thereon, applying a thin coating of oil-free phenol formaldehyde resin to the surface in the presence of the alkali, and baking it thereon.

3. The method as set forth in claim 2, in which the applied resin contains from 10% to 45% by volume of an inert, inorganic, non-fibrous, suspensible pigment, and in which a plurality of coatings thereof are applied, each coating being dried and baked before application of the succeeding coating to leave it potentially reactive but inert to solvent during the application treatment, and in which all of the layers are converted to the non-reactive state thereafter.

4. A method of treating a molded phenol formaldehyde resinous material having a smooth polished surface which comprises treating the surface with a hot dilute solution of caustic alkali for a few minutes, rinsing off substantially all of the caustic alkali to leave a trace of alkali, drying the object, applying an oil-free phenol formaldehyde resinous coating thereto, drying the coating, applying at least a second oil-free phenol formaldehyde coating thereon, and then baking the object to convert the added coatings to the insoluble infusible stage.

CHARLES H. HEMPEL.